United States Patent [19]

Boyden et al.

[11] 4,037,194

[45] July 19, 1977

[54] CURRENT SENSING ALARM CIRCUIT FOR A MOTOR VEHICLE

[76] Inventors: Willis G. Boyden; Richard A. Shaw, both of 932 Wash St., Norwood, Mass. 02062

[21] Appl. No.: 641,662

[22] Filed: Dec. 17, 1975

[51] Int. Cl.² .............................................. B60R 25/10
[52] U.S. Cl. .............................. 340/63; 340/248 D; 340/249; 340/253 R
[58] Field of Search .............. 340/63, 64, 65, 248 R, 340/248 A, 248 D, 248 P, 249, 253 R, 253 P

[56] References Cited

U.S. PATENT DOCUMENTS 3,706,966  12/1972  So et al. ................................. 340/63

Primary Examiner—Alvin H. Waring
Attorney, Agent, or Firm—Wolf, Greenfield & Sacks

[57] ABSTRACT

The alarm circuit is for detecting the theft of a vehicle and receives its power from the vehicle storage battery. The grounded battery cable is passed through a ferromagnetic toroid having one or more turns of wire wound thereon. An oscillator circuit couples to the toroid and establishes an AC voltage across the coil of wire. If the vehicle is entered the grounded battery cable draws current either from an illuminated light or from the ignition circuit causing a decrease in the voltage across the coil. This decrease in voltage is detected and an alarm is generated.

7 Claims, 1 Drawing Figure

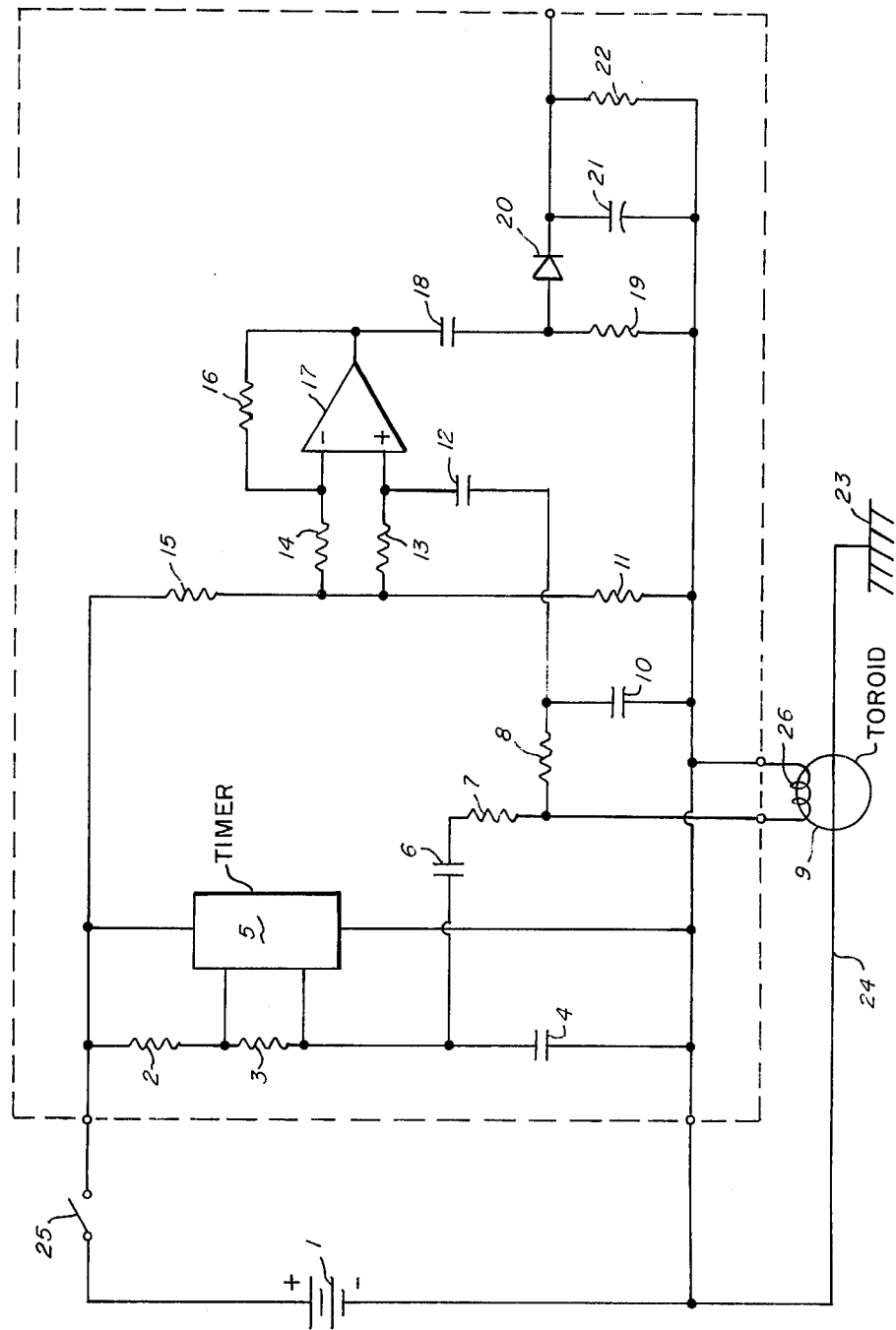

CURRENT SENSING ALARM CIRCUIT FOR A MOTOR VEHICLE

BACKGROUND OF THE INVENTION

The present invention relates in general to an alarm circuit and is concerned, more particularly, with a circuit for use in a vehicle to prevent the theft of the vehicle. The circuit of this invention is more particularly concerned with sensing a current flow in one of the battery connecting to the storage battery of the vehicle.

There presently exists two basic types of car alarms in which intrusion into the cab of the vehicle is detected by an increase in battery power required for the cab light. One alarm device detects an instantaneous change in current being drawn from the battery. The other device detects an instantaneous change in battery voltage. Both of these systems require initial adjustments and both of these systems are inherently unreliable. The current detection system does not always trip the alarm because of changes in parameters of the cab light circuit. The voltage sensing device is characterized by generating false alarm conditions especially in cold weather due to an uncontrollable intermittent internal drop in the battery voltage occasioned by a decrease in temperature. Accordingly, an object of the present invention is to provide an improved alarm circuit preferably for motor vehicles and which reliably detects a current being drawn by the storage battery of the vehicle.

Another object of the present invention is to provide an alarm circuit that is readily installed in a vehicle without the requirement of sensitive adjustments.

A further object of the present invention is to provide an alarm circuit for a vehicle that is simple in construction and is reliable without generating false alarm conditions.

SUMMARY OF THE INVENTION

To accomplish the foregoing and other objects of this invention there is provided an alarm circuit for a motor vehicle for sensing the current drawn by the vehicle batter. This alarm circuit comprises a ring or toroid constructed of a ferromagnetic material and having one of the cables connecting to the battery coupled through the ring. In the preferred embodiment the ground cable from the battery couples through the ring. At least one turn of a wire forming a coil is wound about the ring. Means coupled to the coil for establishing an AC signal in the coil. This means may comprise an oscillator of fixed frequency. This oscillator and other circuitry couple from the coil are powered from the vehicle battery. Circuitry couples from the coil and is responsive to a change in voltage across the coil occasioned by current being drawn by the battery for generating an alarm. This circuitry that couples from the coil may include an integrator circuit and when current is being drawn by the battery the voltage across the coil decreases and in turn the output DC voltage from the integrator decreases possibly even to 0 volts. The output to the integrator may couple to an amplifier and the output of the amplifier may couple to a detector circuit comprising a capacitor. When an unauthorized party enters the vehicle and the cab light illuminates current is drawn by the battery. This causes a decrease in the voltage across the coil and a subsequent decrease in the voltage of the detection circuit. When this occurs an alarm may be signalled by a conventional alarm device. For example, the output of the detection circuit may couple to a relay which is maintained energized except when the voltage across the coil decreases in which case the alarm relay de-energizes and causes an alarm sound.

BRIEF DESCRIPTION OF THE DRAWING

Numerous other objects and features of this invention should now become apparent upon a reading of the following detailed description taken in conjunction with the accompanying drawing of a preferred embodiment in this form of a circuit diagram.

DETAILED DESCRIPTION

In the sole drawing there is shown the car battery 1 which may be a conventional 12 volt storage battery. In the embodiment shown in the drawing the negative terminal of the battery is coupled by way of a battery cable 24 to the chassis 23 of the vehicle. The connection to the chassis 23 may be by means of a bolt and nut arrangement. The cable 24 can be loosened at the chassis so that the cable passes through the ferromagnetic toroid 9. The toroid or ring 9 may have a plurality of turns of wire would about the toroid, as shown, in the form of a coil 26. It is even possible to use a single turn of wire. The coil 26 connects by two lines to the circuit of this invention. The coil connects to the negative terminal of the battery or ground and also to the node between resistors 7 and 8.

The coil 26 has an alternating voltage established therein by means of an oscillator circuit which comprises resistors 2 and 3, capacitor 4 and integrated circuit timer 5. The timer 5 may be a conventional timer such as the well known 555 timer made by a well known manufacturer such as Motorola or RCA. The resistors 2 and 3 and the capacitor 4 may be preselected to operate the oscillator circuit at a predetermined frequency. For example, the oscillator circuit may be arranged to provide an alternating voltage of a couple of volts at several hundred cycles per second across the coil 26. The signal from the capacitor 4 is coupled by way of a decoupling capacitor 6 and limiting resistor 7 to one side of the coil 26.

The coil 26 also couples across an integrator circuit comprised of resistor 8 in capacitor 10. This integrator circuit provides a voltage across capacitor 10 which is equal to the peak amplitude of the AC voltage across the coil 26. The output from the integrator circuit couples by way of decoupling capacitor 12 to the positive input of the integrated circuit operational amplifier 17. Amplifier 17 may be a 741 amplifier such as made by Motorola or RCA.

When a current occurs in the battery cable 24 during the entrance of an intruder into the cab of the vehicle an imbalance occurs and the signal across the coil 26 decreases. Essentially, the current in the cable 24 causes a change in the effective operating point with an attendant decrease in the peak amplitude of the AC signal across coil 26. The operating point is essentially moved along the B-H curve that could cause this decrease in voltage across the coil 26.

The input of amplifier 17 is biased by means of resistors 11, 13, 14 and 15. A feedback resistor 16 couples between the negative input of amplifier 17 and the output of amplifier 17. Capacitor 18 is a decoupling capacitor that couples from the output of the amplifier to storage capacitor 21 by way of diode 20. The output detector circuit also comprises resistor 19 and resistor 22 which is coupled 21. An alarm circuit may be coupled to the resistor 22. Such a circuit may comprise an alarm relay. When the voltage across capacitor 21 is of a sufficient magnitude this relay is latched indicating a no-alarm condition. When the voltage decreases the relay de-energizes causing an alarm condition and sounding an alarm. Under normal operating conditions with no current in the cable 24 there is a DC voltage across the capacitor 21 which is lineary related to the AC voltage across the coil 26. As the DC current increases through the battery cable 24, DC voltage across the capacitor 21 decreases from several volts to possibly 0 volts. Thus, by monitoring the DC voltage across capacitor 21 an increase of current drawn by the battery cable 24 can be detected.

The drawing shows a switch 25 which couples from the positive terminal of the battery to the the amplifier circuit and oscillator circuit. This switch 25 is in a closed position when the vehicle is left unattended. When an authorized operator is bout to enter the vehicle he may either open the switch or have a switch that is key operated so that it is opened thereby disabling the alarm circuit.

What is claimed is:

1. An alarm circuit for a motor vehicle for sensing the current drawn by the vehicle battery comprising;
    a ring of ferromagnetic material having one of the cables associated with the battery coupled therethrough,
    at least one turn of wire forming a coil wound about the ring,
    oscillator means coupled to the coil or establishing an alternating signal therein of a maximum peak-to-peak magnitude when the battery cable has no current flowing therein,
    means including the vehicle battery for providing operating power for the oscillator means,
    integrator means coupled from the coil for providing a level signal of a magnitude corresponding to the peak-to-peak magnitude of the alternating signal coupled from the coil,
    and means coupled from the integrator means and responsive to a decrease in peak-to-peak voltage across the coil occasioned by current being drawn by the battery for generating an alarm.

2. An alarm circuit as set forth in claim 1 wherein said ring is of toroidal shape and has a plurality of turns thereabout.

3. An alarm circuit as set forth in claim 1 wherein said oscillator means comprises a charging circuit including a resistor and capacitor.

4. An alarm circuit as set forth in claim 1 wherein said integrator means comprises a capacitor having the instantaneous voltage thereacross correspondng to the peak-to-peak voltage across the coil and said means coupled from the integrator comprising an amplifier and capacitor storage means, the voltage across the capacitor storage means tracking the voltage level across the capacitor of the integrator means.

5. An alarm circuit as set forth in claim 4 wherein said capacitor storage means comprises a series connected capacitor and diode.

6. An alarm circuit as set forth in claim 1 wherein said means for generating comprises an amplifier circuit coupled from the integrator means and output filter means coupled from the amplifier circuit.

7. An alarm circuit as set forth in claim 6 wherein said amplifier means comprises an operational amplifier and said filter means comprises a capacitor and resistor coupled to the output of the amplifier.

* * * * *